(12) United States Patent
Crosbie et al.

(10) Patent No.: US 6,763,712 B1
(45) Date of Patent: Jul. 20, 2004

(54) FLOW-SENSING DEVICE AND METHOD FOR FABRICATION

(75) Inventors: Gary Mark Crosbie, Dearborn, MI (US); Russell James Haeberle, Plymouth, MI (US); Randall Roy Hume, Chalfont, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/679,668

(22) Filed: Oct. 5, 2000

(51) Int. Cl.[7] .................................................. G01F 1/68
(52) U.S. Cl. ..................................................... 73/204.26
(58) Field of Search .......................... 73/202.5, 204.11, 73/204.16–19, 204.23, 204.25, 204.26, 204.24, 204.22

(56) References Cited

U.S. PATENT DOCUMENTS

| | | | |
|---|---|---|---|
| 4,735,086 A | | 4/1988 | Follmer |
| 5,251,481 A | | 10/1993 | Huck et al. |
| 5,351,536 A | | 10/1994 | Uchiyama |
| 5,508,491 A | | 4/1996 | Sherman |
| 5,804,720 A | * | 9/1998 | Morimasa et al. ......... 73/202.5 |
| 5,965,811 A | * | 10/1999 | Kawai et al. ............ 73/204.26 |
| 6,079,265 A | * | 6/2000 | Wienand et al. ............ 439/630 |
| 6,134,960 A | * | 10/2000 | Yamakawa et al. ....... 73/204.26 |
| 6,180,164 B1 | * | 1/2001 | Ellis et al. .................. 427/101 |
| 6,406,646 B1 | * | 6/2002 | Lee et al. .................... 252/514 |
| 6,444,297 B1 | * | 9/2002 | Bischel ....................... 428/209 |
| 6,527,835 B1 | * | 3/2003 | Manginell et al. ............ 96/102 |

OTHER PUBLICATIONS

"Thick Film Sensors", H. Arima; edited by M. Prudenziati, Handbook of Sensors and Actuators, Elsevier, Amsterdam, 1994, pp. 127–128, 145–150, 451–452, 455.

* cited by examiner

Primary Examiner—Edward Lefkowitz
Assistant Examiner—Corey D. Mack
(74) Attorney, Agent, or Firm—Diane D. Brehob

(57) ABSTRACT

A gaseous flow sensor that utilizes non-platinum resistive sensing elements and a method for fabricating such sensor are disclosed. The gaseous flow sensor is constructed by an insulating substrate; a reference resistor formed on the substrate and disposed in the gaseous flow at an ambient temperature without heating; a flow-sensing resistor formed on the substrate disposed in the gaseous flow that is heated to a temperature higher than the ambient temperature; and an electrical circuit in electrical communication with the reference resistor and the flow-sensing resistor for feeding a current into the flow-sensing resistor in order to keep the two resistors at the same temperature during the operation of the gaseous flow sensor.

22 Claims, 3 Drawing Sheets

FLOW-SENSING DEVICE AND METHOD FOR FABRICATION

FIELD OF THE INVENTION

The present invention relates to a flow-sensing device and method for fabrication and more particularly, relates to a flow-sensing device that utilizes non-platinum materials for the sensing elements which can be fabricated by a thick film printing process and a method for such fabrication.

BACKGROUND OF THE INVENTION

In the design and operation of internal combustion engines, the minimization of exhaust emissions and the improvement in fuel efficiency are two important aspects that must be fulfilled. These aspects can be accomplished, partially, by maintaining an optimum air-to-fuel ratio during the internal combustion process. The optimization of the air-to-fuel ratio in turn requires accurate measurements of an airflow rate into the internal combustion engine. Conventionally, the measurements are accomplished by using a mass airflow sensor (MAFS).

A mass airflow sensor is typically constructed of temperature sensing elements mounted in a rigid housing to form a part of the airflow chamber between an engine air filter and the manifold. The temperature sensing elements which are the heart of the sensor are generally housed in a smaller plastic compartment located on top of the rigid housing formed of either metal or plastic. The sensing elements consist of two elements suspended within the housing such that they are exposed to an airflow through the mass airflow sensor. The material and process for forming the sensing elements are therefore critical in the proper design and operation of the mass airflow sensor circuitry.

The design and fabrication of the sensing elements are important factors in achieving mass airflow sensors that are capable of accurate measurements. For instance, the sensing elements must typically have not only a high temperature coefficient of resistance (TCR), but also a consistent TCR value among the sensing elements fabricated so that they can be paired together. To achieve such consistency, deviations in resistance ratios of the sensing elements at selected ambient temperatures must be minimized. It has been found that in order to properly minimize the resistance ratio deviations, it is desirable to have sensing elements that have resistance values between 19.5 and 20.5 ohms at room temperature, and a difference between the resistances of the elements that are paired together to be less than 0.1 ohm.

U.S. Pat. No. 5,508,491, assigned to the common assignee of the present invention, discloses an electronic mass airflow sensor circuit and a method for manufacturing in which the use of a thick film resistor in an analog conditioning circuitry, rather than as the sensing elements, is disclosed. The circuit utilizes a thick film resistor electrically connected to a secondary sensor element to form a combination element such that resistance ratio of the primary sensor element to the combination element remains constant over varying temperatures.

U.S. Pat. No. 4,735,086, assigned to the common assignee of the present invention, discloses a mass airflow meter that has a first electrically heated resistive film and a temperature dependent resistive film sandwiched between plastic layers and positioned within an air duct. Symmetrically positioned around the first resistive film are a pair of electrically heated resistive films and associated temperature sensors, also encapsulated within plastic layers. Electronic circuit is used to apply electric power to the resistive films for maintaining each of them at a predetermined temperature above ambient air temperature regardless of airflow.

U.S. Pat. No. 5,251,481 discloses a method for protecting a temperature dependent resistor layer from dust by using a special two-layer coating and by placing the resistor pattern recessed from the leading edge where deposits most frequently occur. A material for the temperature dependent resistor layer in the surface resistor of a thin film sputtered platinum applied to a large area and then laser trimmed to shape is disclosed.

U.S. Pat. No. 5,351,536 discloses a finger-type design in which the sensing elements and the conditioning circuitry are placed on the same substrate which is of an irregular, elongated shape so that the temperature sensing element projects into the air stream and the conditioning circuit remains protected from the air stream. While it is mentioned that the resistors can be fabricated by either a thick film or a thin film technique, no processing or design details were disclosed.

In order to fabricate sensing elements that have consistent resistance values, the elements should be fabricated in the same process so that variances caused by changing processing parameters can be eliminated. Furthermore, to lower the cost of fabrication for the sensing elements, alternative non-platinum materials that have similar TCR values as platinum are also desirable.

It is therefore an object of the present invention to provide a gaseous flow sensor that does not have the drawbacks or shortcomings of the conventional gaseous flow sensors that utilize platinum sensing elements.

It is another object of the present invention to provide a gaseous flow sensor that contains sensing elements fabricated of a material that has a consistent temperature coefficient of resistance value.

It is a further object of the present invention to provide a gaseous flow sensor that contains sensing elements that are fabricated of a low cost, non-platinum material.

It is another further object of the present invention to provide a gaseous flow sensor that utilizes sensing elements that are fabricated of a ruthenate-based material by a thick film printing process.

SUMMARY OF THE INVENTION

In accordance with the present invention, a gaseous flow sensor and a method for fabricating such sensor are provided.

In a preferred embodiment, a gaseous flow sensor is provided which includes a substrate that is formed of an electrically insulating material; a reference resistor formed on the substrate and disposed in the gaseous flow without heating at an ambient temperature; a flow-sensing resistor formed on the substrate and disposed in the gaseous flow heated to a temperature higher than the ambient temperature, wherein the reference resistor and the flow-sensing resistor are formed of a non-platinum resistive material; and an electrical circuit in electrical communication with the reference resistor and the flow-sensing resistor.

In the gaseous flow sensor, the non-platinum resistive material includes an oxide composition of Pb, Ru, Si and Bi. The reference resistor has an electrical resistance that is at least 15 times the electrical resistance of the flow-sensing resistor. The reference resistor and the flow-sensing resistor each has a thickness between about 2 $\mu$m and about 30 $\mu$m, and preferably a thickness between about 5 $\mu$m and about 20

μm. The reference resistor may be formed in a serpentine configuration, or formed in a serpentine configuration that has vertical portions connected by horizontal portions with an aspect ratio of length/width of the resistor being at least 2. The electrical circuit maintains a target temperature differential between the reference resistor and the flow-sensing resistor by controlling the magnitude of an electrical current flowing to the flow-sensing resistor. The reference resistor may also be formed in a spiral configuration.

The present invention is further directed to a gaseous flow sensor that includes a substrate that is formed of an electrically insulating material; a reference resistor that is formed on the substrate and disposed in the gaseous flow without heating at an ambient temperature; a flow-sensing resistor formed on the substrate and disposed in the gaseous flow heated to a temperature higher than the ambient temperature, wherein the reference resistor and the flow-sensing resistor both are formed of a single non-platinum resistive material; and an electrical circuit in electrical communication with the reference resistor and the flow-sensing resistor.

The present invention is still further directed to an airflow meter that includes an insulating substrate; a first resistor formed on the insulating substrate that has a first resistance, the first resistor is maintained at ambient temperature; a second resistor formed on the insulating substrate that has a second resistance, the second resistance is maintained at a temperature higher than the ambient temperature, while the first resistance is at least 15 times the value of the second resistance; and an electrical circuit for comparing the second resistance to the first resistance.

In the airflow meter, the insulating substrate may be formed of a ceramic material. The first resistor may be formed in a serpentine configuration, or in a serpentine configuration that has an aspect ratio (length/width of resistor) of at least 2. The first and second resistors may be formed in a thickness between about 2 μm and about 30 μm, and may be formed of a non-platinum containing resistive material.

The present invention is still further directed to a method for fabricating a gaseous flow sensor that can be carried out by the operating steps of first thick film printing a reference resistor from a non-platinum containing paste; thick film printing a flow-sensing resistor from a non-platinum containing paste; forming a circuit for providing electrical communication between the reference resistor and the flow-sensing resistor and for determining a differential resistance therein-between.

The method for fabricating a gaseous flow sensor may further include the step of forming the reference resistor and the flow sensor resistor in the same thick film printing process. The method may further include the step of forming the reference resistor with a resistance that is at least 15 times the resistance of the flow-sensing resistor. The method may further include the step of thick film printing the reference resistor and the flow-sensing resistor to a thickness between about 4 μm and about 50 μm, or the step of firing the reference resistor and the flow-sensing resistor after the thick film printing step.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses a gaseous flow sensor that is constructed of an insulating substrate, a reference resistor and a flow-sensing resistor formed on the substrate, and an electrical circuit connected to the reference resistor and the flow-sensing resistor for determining a gas flow rate through the sensor.

The reference resistor and the flow-sensing resistor of the present invention are formed of a non-platinum resistive material, such as a ruthenate-based paste material. The non-platinum resistive material in a paste form can be advantageously processed by a low cost, thick film printing technique into sensing elements. These ruthenate-based paste materials can be obtained at substantially lower cost than platinum used in the conventional airflow sensors. Another advantage made possible by the present invention method is that various sensing elements can be fabricated in the same thick film printing step and thus achieving a significantly improved consistency in the resistance values, or in the temperature coefficient of resistance values. This is important in that a pair of sensing elements, i.e. a reference resistor and a flow-sensing resistor, may be used in an airflow sensor with great accuracy when the two sensing elements have very close TCR values, for instance, when the difference in the resistances of the two sensing elements is significantly less than 0.1 ohm.

The non-platinum resistive material utilized in the present invention may include an oxide of Pb, Ru, Si and Bi. Several commercially available materials, particularly two ruthenate-based paste materials of Dupont™ 5091D and 5092D have TCR values of about 3800 ppm/° C. and about 3310 ppm/°C., respectively. Another suitable non-platinum resistive material is Ferro™ FX 85-074 which has a slightly lower TCR value of about 2880 ppm/°C., and which is a $RuO_2$ based paste material. It is believed that the high TCR values of the Dupont™ materials is contributed by the air-stable oxides embedded in a glassy matrix containing copper and zirconium oxides.

Figure 1:
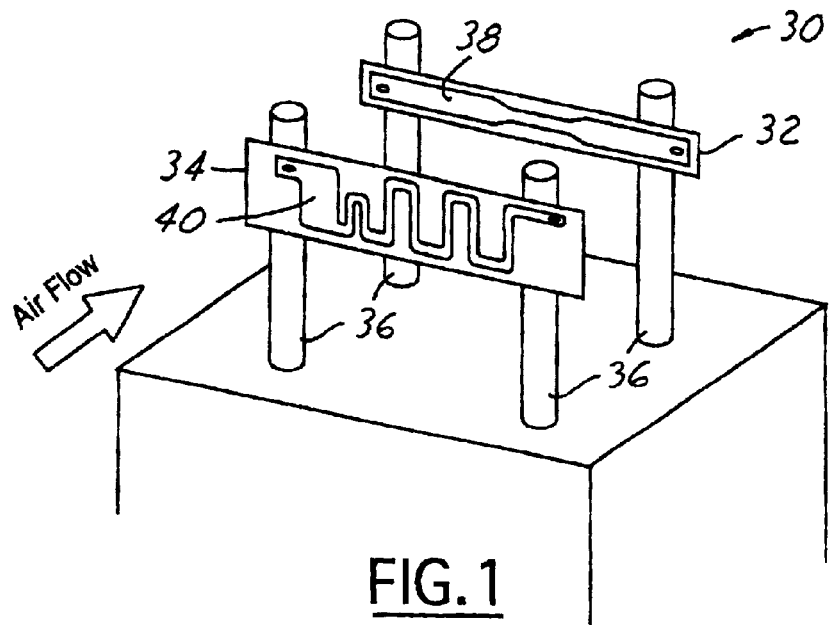
FIG. 1 is a perspective view of a present invention mass airflow sensor equipped with non-platinum sensing elements fabricated by a thick film printing technique.

Referring initially to FIG. 1, wherein a gaseous flow sensor 30 is shown under the present invention. A flow-sensing element 32, which is heated, and a reference element 34, which is not heated and is maintained at ambient temperature, are each mounted on supporting wires 36. The supporting wires 36 may be fabricated of an electrically conductive material, or an electrically conductive material covered by an insulating coating layer so that electrical communications can be established with the sensing elements 38 and 40, respectively.

Figure 2A:
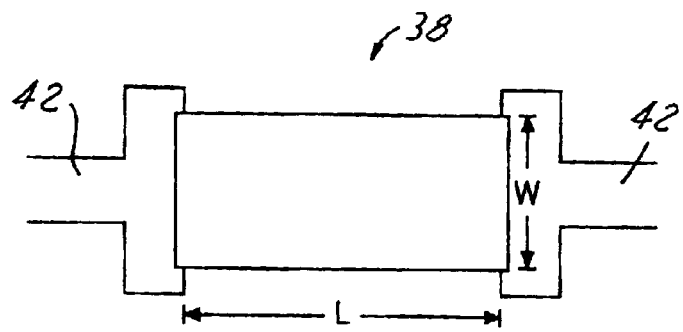
FIG. 2A is a plan view of a present invention non-platinum sensing element that is heated and used as a flow-sensing element.
Figure 2B:
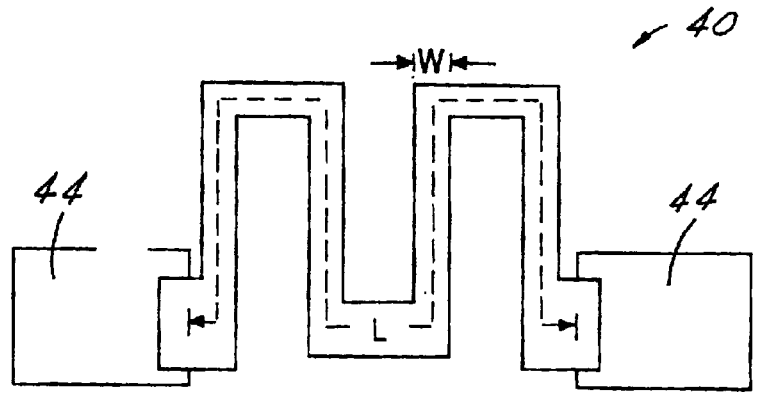
FIG. 2B is a plan view of a present invention sensing element that is not heated and used as a reference resistor.

A plan view of the flow-sensing element 38 and a plane view of the reference element 40 are shown in FIGS. 2A and 2B, respectively. It should be noted that the pattern of the reference element 40, or the reference resistor, is shown differently in FIG. 2B which may be designed to suit any particular application that requires a specific resistance value. For the flow-sensing element 38, which is normally heated, an aspect ratio of length/width (or L/W) may be selected in the range between about 1.4 and about 2. A higher aspect ratio for the reference element 40, i.e. of about 20 or higher is normally used.

In the preferred embodiment, where Dupont™ 5091D paste material is used in forming the flow-sensing element and the reference element, a suitable resistance value for the flow-sensing element, or the heated element, 38 which has a geometry of about 2 square, is about 20 ohms/sq, while a suitable resistance value for the reference resistor, or the cold resistor, 40 which has a geometry of about 40 square, may be about 440 ohms/sq. In other words, a suitable ratio of the resistance values between the cold resistor and the hot resistor is about 22:1, even though any suitable resistance ratio of larger than 10:1 may be utilized in the present invention novel gaseous flow sensor.

FIGS. 2A and 2B further illustrate electrical conductors 42 and 44 for providing electrical communication to the flow-sensing element 38 and to the reference element 40, respectively.

Figure 3:
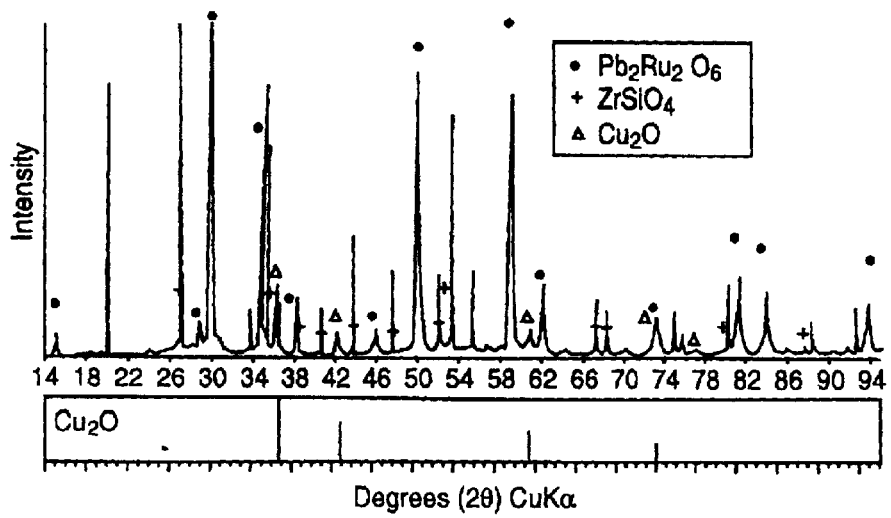
FIG. 3 is an x-ray diffraction spectrograph of a ruthenate-based paste material utilized in the present invention method for forming the sensing elements.

A suitable low cost method for forming the sensing elements, i.e. either the flow-sensing element 38 or the reference element 40, is by a thick film printing technique. In the preferred embodiment, a Dupont™ 5091D material is utilized in the thick film printing technique. The material has a screen mesh density of 325 in.$^{-1}$, an emulsion thickness of $0.3 \times 10^{-3}$ in. and a printed thickness between about 19 $\mu$m and about 24 $\mu$m which results in a fired thickness between about 13 $\mu$m and about 15 $\mu$m. Chemical analysis indicates that the Dupont™ 5091D paste material is a Ru-based pyrochlore which is intermediate between $Pb_2Ru_2O_6$ and $Bi_2Ru_2O_7$; zircon ($ZrSiO_4$); and cuprite ($Cu_2O$). A spectrograph obtained by an x-ray diffraction spectrometer on the Dupont™ 5091D paste material is shown in FIG. 3, illustrating the three major components of $Pb_2Ru_2O_6$, $ZrSiO_4$ and $Cu_2O$ of the composition.

Figure 4:
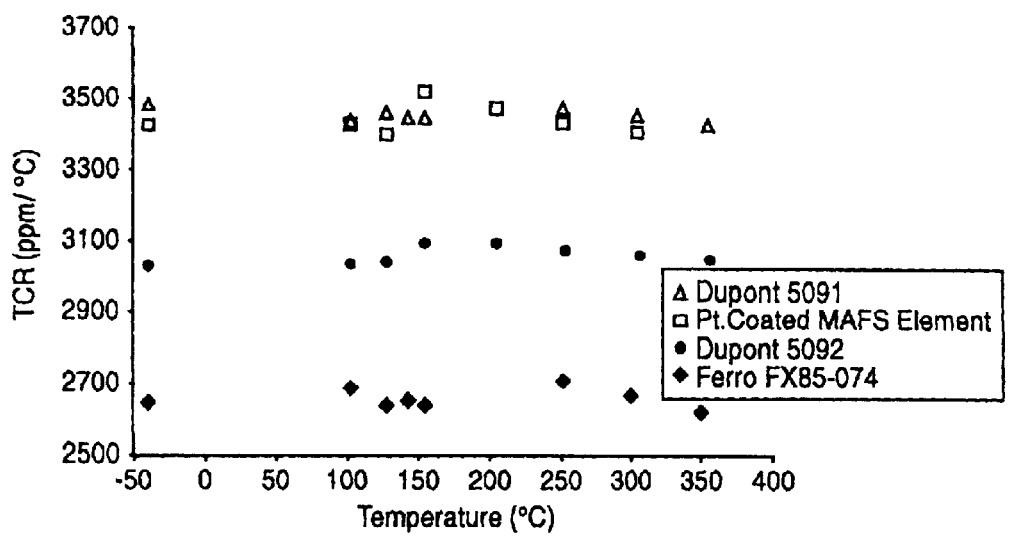
FIG. 4 is a graph illustrating the dependencies of the temperature coefficient of resistance values on temperatures in a range between −40° C. and 350° C. for various paste materials and for platinum resistors.

The temperature coefficient of resistance values were determined in a temperature range between −40° C. and 350° C. in a temperature controlled chamber. In the measurements, printed ceramic boards were edge-mounted in a convection airflow chamber and the temperature was held in sequence at various temperature settings. The dependency of TCR values in ppm/° C. on the test temperatures is shown in FIG. 4 indicating that the Dupont™ 5091D paste material exhibits the same dependency as the conventional platinum coated sensing elements for mass airflow sensors. The data proves that the Dupont™ 5091D paste material is a suitable substitute for the conventional platinum material as far as the TCR values are concerned.

Figure 5:
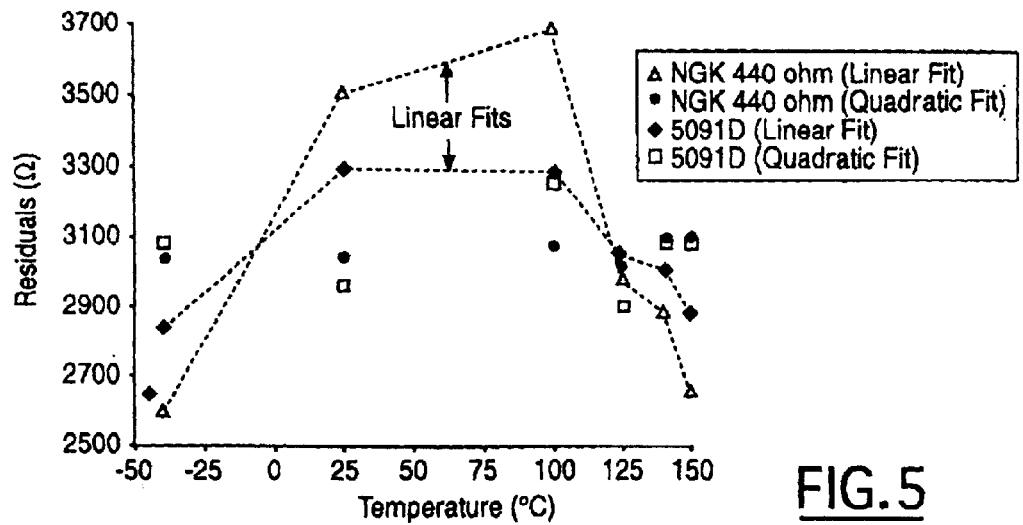
FIG. 5 is a graph illustrating the dependency of residuals on temperatures for various non-platinum paste materials and for a platinum material.

A comparison of residuals (in units of ohm) for linear and quadratic fits of the resistance vs. temperature data for Dupont™ 5091D (formed in a serpentine pattern) and for platinum coated elements is shown in FIG. 5. It is seen that the quadratic fit provides a significantly better correlation than the linear fit. For instance, the residual errors of the linear fitting of the platinum samples are about 2 ohms, while the errors of the quadratic fit residuals of the same platinum samples are less than 0.4 ohms.

Figure 6:
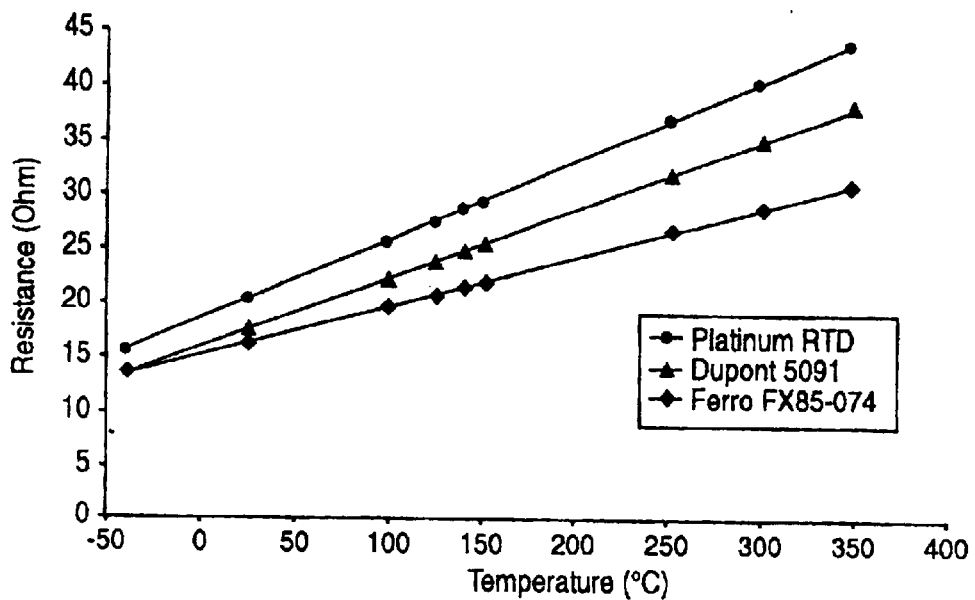
FIG. 6 is a graph illustrating the dependency of resistances on temperatures for two non-platinum paste materials and for a platinum material.

FIG. 6 shows various plots of resistance vs. temperature curves for three different materials used for the sensing elements, i.e. a platinum material, a Dupont™ 5091D material, and a Ferro™ FX 85-074 material. It is seen that the Dupont™ 5091D material (represented by the center line) illustrates the same temperature dependency as the conventional platinum material, which confirms that the Dupont™ 5091D material is a suitable substitute for the conventional platinum resistive material.

Figure 7:
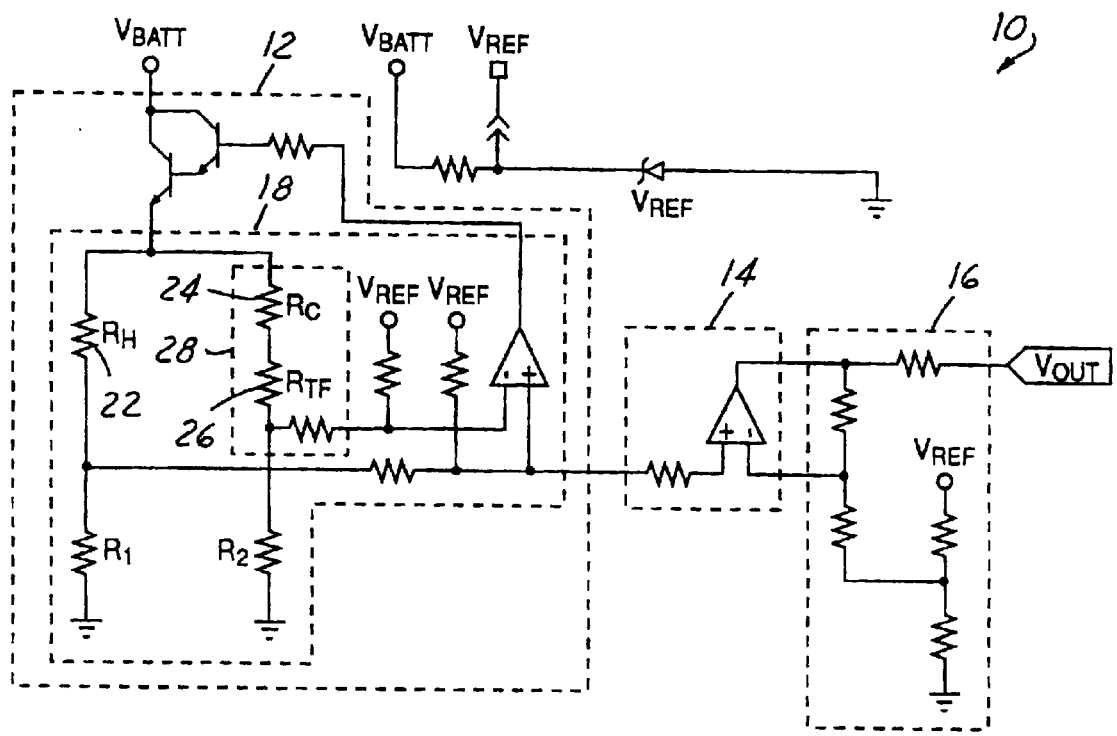
FIG. 7 is a circuit diagram illustrating an electrical circuit incorporating the present invention reference resistor ($R_C$) and flow-sensing resistor ($R_H$).

An industrial application of the present invention novel sensing elements utilized in a gaseous flow sensor can be illustrated in FIG. 7, which shows a schematic diagram for utilizing the present invention gaseous flow sensor. The mass airflow sensor circuit 10 includes a sensor 12, an amplifier 14 and a gain-offset configuration 16. The sensor 12 generally includes a balanced bridge configuration 18, such as a Wheatstone bridge or other similar configurations that is well-known in the art. The bridge 18 is comprised of primary and secondary sensing elements 22 ($R_H$ or the hot resistor) and 24 ($R_C$ or the cold resistor). The hot resistor (or the flow-sensing resistor) 22 and the cold resistor (or the reference resistor) 24 are suspended in a rigid housing of the mass airflow sensor.

To accurately measure airflow, the flow-sensing resistor 22 and the reference resistor 24 must have positive TCR's, i.e. the resistances of the flow-sensing resistor 22 and the reference resistor 24 increase as the temperature increases. As shown in FIG. 7, bridge 18 also includes a thick film resistor 26 which is electrically connected to the reference resistor 24 to form a combination element 28. The thick film resistor 26 is preferably connected in-series with the reference resistor 24. The thick film resistor 26 must have a substantially zero TCR, thus the resistance of the thick film resistor 26 must not be substantially altered by changes in temperature.

The present invention novel sensing elements for use in gaseous flow sensors, in contrast to the conventional sensing technology of platinum spiral wound pattern on a ceramic bobbin, presents the following major advantages.

Firstly, the paired sensing elements can be closely matched by thick film printing at the same time. Secondly, the present invention sensing elements provide the most exacting resistor values vs. time for different layout designs and trimming strategies. Thirdly, the thick film sensing elements provide considerable cost savings. Fourthly, the thick film sensing elements allow a planar geometry which, in turn, provides substantial benefits over cylindrical geometries such as that used in sensing reversed flow. Fifthly, the reliability of a thick film printing method enhances the reliability of the sensing devices fabricated, especially when used in underhood applications. Sixthly, the thick film printed sensing elements of the present invention are laser trimmable as ganged elements before singulation, and therefore require less fixturing for trimming and less sensor calibration flow adjustments after being assembled into a mass airflow sensor unit.

The present invention gaseous flow sensor utilizing sensing elements fabricated of non-platinum resistive materials by a thick film printing technique and a method for such fabrication have therefore been amply described in the above description, and in the appended drawings of FIGS. 1~7.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the invention.

The embodiment of the invention in which an exclusive property or privilege is claimed are defined as follows.

What is claimed is:

1. A gas flow sensor, comprising:

a reference resistor element comprised of an oxide electrically resistive material;

a flow-sensing resistor element comprised of said oxide electrically resistive material; and an electrical circuit coupled to said reference resistor element and said flow-sensing resistor element, said electrical circuit responsive to a ratio in resistance between said reference oxide electrically resistive material and said flow-sensing oxide electrically resistive material wherein said ratio in resistance is a function of a rate of gas flow over said materials.

2. The gas flow sensor according to claim 1 wherein said oxide electrically resistive material comprises a ruthenium containing oxide in a glassy matrix.

3. The gas flow sensor of claim 1 wherein a temperature of said reference resistor is substantially similar to a temperature of a gas flow flowing past said resistors.

4. The gas flow senor of claim 3 wherein said electrical circuit further comprises a current source coupled to said flow-sensing resistor and said electrical circuit is adapted to adjust a current flow from said current source to maintain a predetermined resistance ratio between said flow-sensing resistor and said reference resistor.

5. The gas flow sensor of claim 1 wherein said gas is air.

6. The gas flow sensor of claim 1, wherein said electrical circuit is capable of determining a resistance of said reference resistor and a resistance of said flow-sensing resistor, and a mass flow rate of said gas flow is a function of said resistances.

7. The gas flow sensor of claim 1 wherein said electrical circuit further comprises a current source coupled to said flow-sensing resistor element and said electrical circuit is capable of retaining a target temperature differential between said reference resistor element and said flow-sensing resistor element by controlling current flow to said flow-sensing resistor element.

8. The gas flow sensor of claim 1 wherein said reference resistor element and said flow-sensing resistor element are coupled to an electrically insulating substrate.

9. The gas flow sensor of claim 1 wherein said reference resistor element is coupled to a first electrically insulating substrate and said flow-sensing resistor element is coupled to a second electrically insulating substrate.

10. The gas flow sensor of claim 1 wherein said resistor elements have a temperature coefficient of resistance in the range of about 2600 to 3800 ppm/° C.

11. A gas flow sensor, comprising:

a reference resistor element comprised of an oxide electrically resistive material attached to a first portion of an electrically insulating substrate;

a flow-sensing resistor element comprised of said oxide electrically resistive material and attached to a second portion of said electrically insulating substrate material; and an electrical circuit coupled to said reference resistor element and said flow-sensing resistor element, said electrical circuit responsive to a ratio in resistance between said reference oxide electrically resistive material and said flow-sensing oxide electrically resistive material wherein said ratio in resistance is a function of a rate of gas flow over said materials, said electrical circuit further comprising a current source coupled to said flow-sensing resistor and said electrical circuit is adapted to adjust a current flow from said current source to maintain a predetermined resistance ratio between said flow-sensing resistor and said reference resistor.

12. The gas flow sensor according to claim 11, wherein said oxide electrically resistive material comprises a ruthenium containing oxide in a glassy matrix.

13. The gas flow sensor according to claim 12 wherein said ruthenium-containing oxide resistor elements comprises at least one of Pb, Si and Bi.

14. The gas flow sensor according to claim 11, wherein said reference resistor has an electrical resistance at least 10 times the electrical resistance of said flow-sensing resistor.

15. The gas flow sensor according to 11, wherein said reference resistor element aid said flow-sensing resistor element each have a thickness between 2 and 30 micrometers.

16. The gas flow sensor according to claim 11, wherein said reference resister element and said flow-sensing resistor element each has a thickness between 5 and 20 micrometers.

17. The gas flow sensor according to claim 11 wherein said reference resistor element is formed in a serpentine configuration.

18. The gas flow sensor according to claim 11 wherein said reference resistor element is formed in a serpentine configuration having vertical segments connected by horizontal segments with an aspect ratio of length/width of the resistor being at least 2.

19. The gas flow sensor according to claim 11 wherein said electrical circuit maintains a target temperature differential between said reference resistor element and said flow-sensing resistor element by controlling an electrical current flowing to said flow-sensing resistor element.

20. The gas flow sensor of claim 11 wherein said first and second portions of said electrically insulating substrate are contiguous.

21. The gas flow sensor of claim 11 wherein said first and second portions of said electrically insulating substrate are separated.

22. The gas flow sensor of claim 11 wherein said resistor elements have a temperature coefficient of resistance in the range of about 2600 to 3800 ppm/° C.

* * * * *